428-408 SR

2/13/79 XR 4,139,675

United States Patent [19]

Nagai et al.

[11] 4,139,675

[45] Feb. 13, 1979

[54] RECORDING PAPER WITH RESIN-CONTAINING RECORDING LAYER AND HEAT SENSITIVE ADHESION LAYER

[75] Inventors: Koichi Nagai; Ryuji Ishikawa; Koichi Imamura; Fumio Fujimura; Youhei Shiokoshi, all of Tokyo, Japan

[73] Assignee: Jujo Paper Co., Ltd., Tokyo, Japan

[21] Appl. No.: 673,875

[22] Filed: Apr. 5, 1976

[30] Foreign Application Priority Data

Apr. 8, 1975 [JP] Japan .................................. 50/42618

[51] Int. Cl.[2] .......................... B32B 27/00; C09J 7/02

[52] U.S. Cl. .................................... 428/349; 428/914; 428/509; 428/510; 428/511; 428/512; 428/513; 428/514; 428/515; 428/516; 428/517; 428/518; 428/519; 428/520; 428/508; 428/346; 428/331; 428/328; 428/344; 428/367; 428/375; 428/354; 428/384; 428/408; 428/441; 428/442; 428/323; 428/488; 96/1.5 N; 428/429; 96/83; 96/84 M; 156/82; 428/477; 428/913; 428/383; 428/391

[58] Field of Search ............... 428/346, 347, 349, 411, 428/477, 488, 913-914, 515-520, 508, 514; 96/1.5 N, 87 A, 83, 84 M

[56] References Cited

U.S. PATENT DOCUMENTS

| | | | |
|---|---|---|---|
| 3,165,421 | 1/1965 | Politi et al. | 428/349 |
| 3,202,528 | 8/1965 | James | 428/349 X |
| 3,649,336 | 3/1972 | Paesschen et al. | 428/913 X |
| 3,672,981 | 6/1972 | Sloan et al. | 428/913 X |
| 3,861,912 | 1/1975 | Ibrahim | 428/913 X |
| 3,907,557 | 9/1975 | Bolduc, Jr. | 96/1.5 |

*Primary Examiner*—P. C. Ives

*Attorney, Agent, or Firm*—Stevens, Davis, Miller & Mosher

[57] ABSTRACT

Recording paper for use in, for example, an electrostatic recording system, comprising an electrically conductive base layer, a photoconductive or dielectric recording layer disposed on one surface of the base layer, and a heat-sensitive bonding layer disposed on the other surface of the base layer. The bonding layer is non-tacky at normal temperature, and it develops tackiness when heated after a recording has been made on the recording paper.

16 Claims, 2 Drawing Figures

Figure 1:
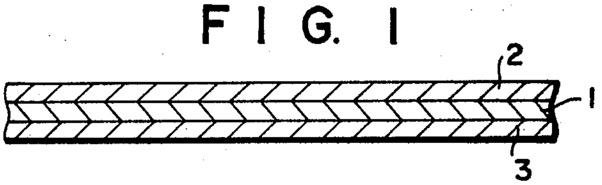

RECORDING PAPER WITH RESIN-CONTAINING RECORDING LAYER AND HEAT SENSITIVE ADHESION LAYER

This invention relates principally to novel recording paper which is capable of electrostatic recording with the usual electrostatic recording type apparatus and which is capable of cohesion or adhesion on any desired surface by heating. The same technique is also applicable to other recording materials composed of a dielectric layer and a conductive base layer, for example, a photoconductive material.

An electrostatic recording system has come into extensive uses for the long-distance communication of documents with a facsimile and as well as besides for tickets, bill, receipts, outside addresses, price tags and labels and other information out-put systems. The information output recordings are often used under conditions where they are stuck onto envelopes, postcards and the like ground paper, commodity packings, etc. In case of these uses, in order to avoid the trouble of applying a bonding agent each time the information has been printed and recorded and then sticking the recording medium, there has been adopted, for example, a method in which the surface of the recording medium is coated with a adhesive beforehand. Since, however, such methods are of the type which employs the so-called pressure-sensitive adhesive, a release paper need be jointly used in any case. The expedient therefore has the disadvantages that the manufacturing process is complicated and that the cost becomes high. As a dielectric recording medium of the type which is not attended with the release paper, there has been known one which uses a rewetting adhesive agent. In that case, however, the sticking to a plastic film etc. is generally impossible. Besides, the water content to be bestowed needs be adjusted. Moreover, the blocking due to moisture during storage is a problem.

This invention consists in recording paper wherein a dielectric or photocoductive recording layer is disposed on a surface of an electrically conductive base layer and wherein a layer which develops a cohesive property (tenacity) and/or an adhesive property by heating and which is endowed with an electrically conductive property as may be needed is disposed on the opposite surface.

It is an object of this invention to provide recording paper which does not require separate paper because the cohesion or adhesion layer is incohesive or inadhesive at room temperature and which is therefore applicable in that condition for use in a recording apparatus since it is similar to conventional electrostatic recording paper etc. having no cohesion or tackiness layer. Another object is to provide a recording paper which can be adhered not only to plain paper but also to the surface of wood, metal, glass, synthetic resins and other materials by heating the cohesion or adhesion layer. Still another object is to provide a recording paper which can hold the cohesive property several hours after heating by properly selecting the compounding ratios of the cohesive or adhesive materials. A further object is to provide a recording paper which can make the adhesion of the paper to a substrate or the correction of the adhesion remarkably easy.

Figure 2:
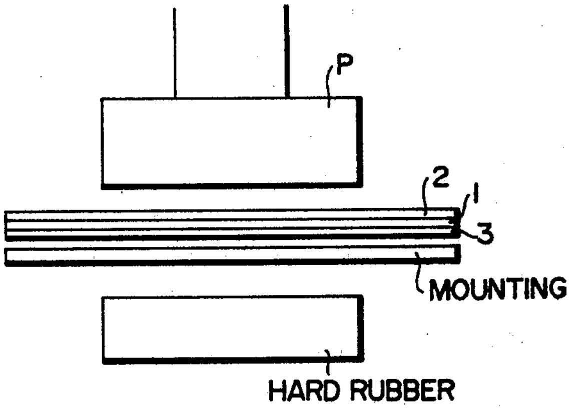

Other objects, features and effects of this invention will become more apparent from the following detailed description taken in conjunction with the drawing in which:

FIG. 1 is an expanded sectional view of the recording paper of this invention, and FIG. 2 is a schematic view of a thermal pressure bonding equipment for use in this invention.

Referring to FIG. 1, the recording paper according to this invention is so laminated that a photoconductive or dielectric recording layer 2 is disposed on one surface of an electrically conductive substrate or base layer 1 which serves as a supporter and that a heat-sensitive cohesion or adhesion layer 3 which develops a cohesive or adhesive property by heating is disposed on the other surface of the base layer 1, i.e., the surface opposite from the recording layer.

The recording layer 2 constituting the recording paper of this invention is mainly made of a photoconductive substance such as zinc oxide, or a light-insensitive insulating high polymer. The high polymer includes polyvinyl chloride, polyvinyl acetate, polyvinylidene chloride, polyvinyl chloride - vinyl acetate copolymers, polyvinyl acetal, saturated and unsaturated polyesters, alkyd resins, various modified alkyd resins, silicone resins, various polyacrylate esters as well as polymethacrylate esters and their copolymers, styrene —butadiene copolymers, melamine — formaldehyde resins, other known resins and their derivatives and copolymers, etc. In order to achieve known effects for the external appearance, the writing property and so forth and also to prevent blocking upon heating, it is desirable to suitably add filling material or a pigment, such as titanium oxide, silica, and barium sulfate, etc. to any one of the above-mentioned materials or a mixture thereof.

The base layer 1 being the conductive supporter comprises a sheet made of natural pulp or any other cellulosic fiber or a synthetic or derivative high polymer fiber, or a synthetic resin film or sheet and a conductor which is applied on the sheet, which is impregnated in the sheet or which is kneaded in the film or sheet. The conductor includes polysulfonates such as polystyrene sulfonate and polyvinyl sulfonte; polycarbonates such as polyacrylic acid and styrene — maleic anhydride copolymer; polyphosphates such as polyvinyl phosphate; polyamines such as polyethylene imine; high polymer electrolytes of, for example, quarternary ammonium salts such as polyvinyl benzil trimethyl ammonium chloride, poly N, N dimethyl 3-5 methyl pyperidium chloride and poly 4 vinyl N methyl pyridinium chloride; inorganic electrolytes such as sodium chloride; conductive power of metal carbon; etc. Alternatively, the base layer 1 is obtained in such a way that a separate carrier which has been caused to contain such electrically conductive substance beforehand is added or applied when the sheet is fabricated. The base layer 1 may also be so constructed that a metallic foil or the like is laminated on a supporting member.

For the heat-sensitive cohesion or adhesion layer 3, there can be utilized a substance which develops the cohesive or adhesive proerty when heated. This substance includes a large number of thermoplastic resins, for example, polyvinyl acetate resins; polyacrylate ester resins; polymethacrylate ester resins; polyvinyl chloride; polyvinylidene chloride and polyolefin and their copolymers; and thermoplastic prepolymers such as unsaturated polyester prepolymer and dialyl phthalate prepolymer. In order that the substance of the cohesion or adhesion layer 3 may exhibit an intense tenacity with respect to the surface of a different sort of substance when molten, the joint use of a so-called tackifier is preferable. However, when a liquid plasticizer is added to the tackifier as is commonly carried out, tackiness appears even at the room temperature, and hence, the common practice is not favorable for accomplishing the objects of this invention. In order to better achieve the objects of this invention, accordingly, it is desirable to mix into the base resin a tackifier which is solid at room temperature alone or to compound into the base resin a plasticizer which is solid at room temperature together with the tackifier or alone. Owing to the addition, it becomes possible to render the adhesion layer tacky at a temperature lower by at least 10° C. than the melting point of the resin of the recording layer. It becomes possible to tackify the adhesion layer by thermal pressure from, for example, the recording layer side and to stick the recording paper onto ground paper.

The tackifier herein referred to includes natural rosin, hydrogenated rosin and resin-maleic acid anhydride addition and their esters; aromatic petroleum resins, polymers of terpene, pinene etc. and low-molecular styrene resins or their copolymers; etc. Regarding the proportion of addition, it is favorable that 10 – 200 parts by weight of such tackifier substance are added to 100 parts by weight of the polymer solid content.

As a plasticizer which is solid at the room temperature, there are known diphenyl phthalate, dicyclohexyl phthalate, dimethyl cyclohexyl phthalate, various benzoic esters, cyclohexyl p-toluene sulfonamide, several amine series compounds, etc. 10 – 200 parts by weight of such plasticizer substance are added to 100 parts by weight of the base polymer solid content. Since the tackifier and the plasticizer are in the solid state at room temperature, they need be rendered into fine powders before the addition in such a way that they are sufficiently pulverized or that they are emulsified in a molten or dissolved condition.

The tackifier and/or the plasticizer are mixed with the base or main constituent resin, and the mixture is applied onto the recording paper base or substrate layer. It is thereafter dried at a somewhat low temperature at which the recording layer resin and the adhesion layer resin do not melt or soften yet. The dried layer thus obtained is incohesive or non-tacky at room temperature. The adhesion layer is directly or indirectly heated at such a temperature or by such a method that the recording layer resin does not melt. Thus, the adhesion layer main constituent resin and the tackifier and/or plasticizer are molten and mixed to develop the cohesive property or tackiness. Therefore, the mixture is the most suitable for the objects of this invention.

It is favorable that the cohesion or adhesion layer is electrically conductive. In order to bestow a conductive property on the cohesion or adhesion layer, various conductive agents or electroconductive polymers or oligomers as used for the base layer 1 can be added. When the quantity of addition of the conductive agent is too large, the cohesive or adhesive property is degraded. Therefore, the quantity of addition of the conductive agent is made 5 – 100 parts by weight, preferably 10 – 50 parts by weight, as a solid content with respect to 100 parts by weight of the cohesion or adhesion agent. The quantity of application of the cohesion or adhesion layer is made at least 10 gr., preferably at least 20 gr., per $m^2$ of the base layer, and a satisfactory cohesive or adhesive property is attained at this time.

FIG. 2 shows an embodiment of a thermal pressure bonding equipment. The heat-sensitive cohesion or adhesion layer, for example, an electrostatic recording cohesion or adhesion paper according to this invention is easily bonded in such a way that, after electrostatic printing, it is pressed from the printed surface onto a surface, to which it is to be stuck, by a vertical motion of a heating press portion (P) of a heat roll, a heat plate or the like. Example of thermal pressure conditions for the bonding are a press pressure of 2 $kg/cm^2$ and a time of about 3 seconds.

In this case, as indicated in the following table, the tackiness developing temperature of the adhesion layer should desirably be lower by at least 10° C. than the melting temperature of the dielectric layer in order to thermally and pressingly bond the recording paper without causing any damage to the dielectric layer.

In the following table:

a . . . thermally and pressedly bonded state;
- O . . . perfectly adhesived,
- Δ . . . imperfectly adhesived,
- X . . . scarcely adhesived.

b . . . damage to the dielectric layer;
- O . . . quite no damage,
- Δ . . . some damage,
- X . . . conspicuous damage.

TABLE:

Judgements in the case where the heating has been executed from the dielectric layer (recording layer)

| | Dielectric layer<br>Composition of conductive heat-sensitive tackifier, mol ratios in parentheses | | ° C | Polyvinyl chloride - vinyl acetate copolymer melting temperature of 90° C. | | | | | | Polymethyl methacrylate, melting temperature of 110° C. | | | | | | Note |
|---|---|---|---|---|---|---|---|---|---|---|---|---|---|---|---|---|
| | | | | 60 | 70 | 80 | 90 | 100 | 110 | 80 | 90 | 100 | 110 | 120 | 130 | |
| 1 | Unsaturated polyester prepolymer (maleic acid, phthalic acid. ethylene glycol 1 : 1 : 2)<br>Hydrogenated rosin | 100 parts<br>100 parts | a | X | X | O | O | O | O | O | O | O | O | O | O | Recording paper was prepared in conformity with Example 2 |
| | | | b | O | O | O | Δ | X | X | O | O | O | Δ | X | X | |
| 2 | Diallyl phthalate prepolymer<br>Petroleum resin commercially available | 100 parts<br>150 parts | a | X | X | X | X | O | O | X | X | O | O | O | O | Recording paper was prepared in conformity with Example 3 |
| | | | b | O | O | O | Δ | X | X | O | O | O | Δ | X | X | |
| 3 | Polyvinyl acetate resin<br>Dicyclo phthalate<br>Quaternary ammonium salt series conductive polymer | 100 parts<br>100 parts<br>30 parts | a | X | Δ | O | O | O | O | O | O | O | O | 0 | 0 | Recording paper was prepared in conformity with Example 4 |
| | | | b | O | O | O | Δ | X | X | O | O | O | Δ | X | X | |
| 4 | Ethylene/polyvinyl acetate copolymer (70/30)<br>Silica powder<br>Quaternary ammonium salt series conductive polymer | 100 parts<br>10 parts<br>30 parts | a | X | Δ | O | O | O | O | O | O | O | O | O | O | Recording paper was prepared in conformity with Example 5 |
| | | | b | O | O | O | Δ | X | X | O | O | O | Δ | X | X | |
| 5 | Ethylene/polyacrylate copolymer (80/20)<br>Hydrogenated rosin glycerin ester (ester gum H)<br>Quaternary ammonium salt series conductive polymer | 50 parts<br>50 parts<br>20 parts | a | Δ | O | O | O | O | O | O | O | O | O | O | O | Recording paper was prepared in conformity with Example 6 |
| | | | b | O | O | O | Δ | X | X | O | O | O | Δ | X | X | |
| 6 | Polyvinyl acetate/polyacrylate 2-ethyl hexyl copolymer (75/25)<br>Hydrogenated rosin penta-erythritolester (ester gum Hp)<br>Quaternary ammonium salt series conductive polymer | 70 parts<br>50 parts<br>30 parts | a | X | X | X | Δ | O | O | X | Δ | O | O | O | O | Recording paper was prepared in conformity with Example 7 |
| | | | b | O | O | O | Δ | X | X | O | O | O | Δ | X | X | |
| 7 | Polyvinyl acetate (Mobinyl DC)<br>Quarternary ammonium salt series conductive polymer | 100 parts<br>15 parts | a | X | X | X | X | X | X | X | X | X | X | O | O | Recording paper was prepared in conformity with Example 8 |
| | | | b | O | O | O | Δ | X | X | O | O | O | Δ | X | X | |

Where the heating is executed from the back side, the cohesion or adhesion surface is directly heated by, for example, hot air, flames or infrared rays. Thus, the tackiness is developed. Subsequently, the recording paper is stuck to a surface to which it is to be bonded.

The following examples further describe the invention.

EXAMPLE 1

Each surface of fine quality paper of 52 gr/m$^2$ was impregnated with 2 gr/m$^2$ of a quaternary ammonium salt series conductive polymer. On the front surface of conductive base paper thus obtained, 4 gr/m$^2$ of the polymethacrylate resin (a substance forming the dielectric layer) was applied. On the back surface, there was applied 20 gr/m$^2$ of a solution which was prepared in such a way that 50 parts of a particulate synthetic terpene resin were added to 80 parts of a solid content of a polyvinyl acetate — polyacrylate ester copolymer emulsion and that 20 parts of a quaternary ammonium salt series conductive polymer as diluted in alcohol were added to the resultant mixture. Then, the paper was dried at 70° C. The recording paper had a good electrostatic printing characteristic, and could be bonded to ground paper by heating at 110° C.

EXAMPLE 2

On the back surface of the conductive base paper in Example 1, a solution was applied in the same way as the above example. The solution was obtained in such a way that maleic acid, phthalic acid and ethylene glycol were mixed in proportions of 1 : 1 : 2, and they were caused to react at 180° C. for 5 hours to produce an unsaturated polyester prepolymer and 100 parts of hydrogenated rosin were added to 100 parts of the prepolymer. After the application, 4 gr/m$^2$ of a polyvinyl chloride - vinyl acetate copolymer resin was applied in the form of a methyl ethyl ketone solution to the front surface. The recording paper thus obtained had a good electrostatic recording characteristic and exhibited a good thermal tackiness properly.

EXAMPLE 3

One surface of wood free paper of 52 gr/m$^2$ was impregnated with 2 gr/m$^2$ of a quaternary ammonium salt series conductive polymer. On the other surface, 35 gr/m$^2$ of an adhesive was applied, the adhesive being obtained in such a way that 150 parts of a petroleum resin commercially available were added to 100 parts of a diallyl phthalate prepolymer powder and that the resultant mixture was dispersed in water. After drying the paper, 4 gr/m$^2$ of an acrylate ester resin for the dielectric recording was applied onto the conductive layer side. The recording paper thus obtained exhibited good electrostatic recording and thermal bonding characteristics.

EXAMPLE 4

On the front surface of the conductive base paper in Example 1, there was applied 5 gr. of a polyvinyl chloride — vinyl acetate copolymer into which titanium oxide was mixed. On the back surface, there was applied 20 gr/m$^2$ of a solution which was prepared in such a way that 100 parts of a solid content of a dispersion liquid of fine grains of dicyclohexyl phthalate, which is a solid state plasticizer at the normal temperature, were added to 100 parts of a solid content of a polyvinyl acetate emulsion and that 30 parts of a quaternary ammonium salt series conductive polymer as diluted in water were added to the resultant mixture. Thereafter, the paper was dried at 60° C. The recording paper thus obtained had a good electrostatic recording characteristic. By thermally pressing the recording paper at 80° C. from the recording layer side, it could be bonded to ground paper. The cohesion or adhesion layer sustained an cohesive power over a long time after the heating, and had a nature which permits utilization in the field of prior-art adhesive tapes.

EXAMPLE 5

On the front surface of the conductive base paper in Example 1, 5 gr. of a polyvinyl chloride — vinyl acetate copolymer with zinc oxide mixed therein was applied. On the back surface, 20 gr/m$^2$ of a solution was applied, the solution being prepared in such a way that 10 parts of a silica powder and 30 parts of a quaternary ammonium salt series conductive agent as diluted in water were added to 100 parts of a solid content of an ethylene — vinyl acetate copolymer emulsion. Then, the paper was dried at 100° C. The recording paper thus obtained had a good electrostatic recording characteristic. By heating at 80° C., it could be satisfactorily bonded to ground paper.

EXAMPLE 6

On the back surface of the conductive base paper in Example 1, 20 gr/m$^2$ of a solution was applied, the solution being prepared in such a way that 50 parts of hydrogenated rosin glycerin ester as dispersed in water were added to 50 parts of a solid content of an ethylene — acrylate copolymer emulsion and that 20 parts of a quaternary ammonium salt series conductive polymer as diluted in water were added to the dispersion. Thereafter, 4 gr/m$^2$ of a polyvinyl chloride — vinyl acetate copolymer resin was applied on the front surface. The recording paper thus obtained had a good electrostatic recording characteristic, and it exhibited a good bonding property when heated at 70° C.

EXAMPLE 7

On the back surface of the conductive base paper in Example 1, 20 gr/m$^2$ of a solution was applied, the solution being prepared in such a way that 50 parts of hydrogenated rosin pentaerythritol ester as dispersed in water were added to 70 parts of a solid content of a polyvinyl acetate — acrylate copolymer emulsion and that 30 parts of a quaternary ammonium salt series conductive polymer as diluted in water were added to the resultant dispersion. Thereafter, 4 gr/m$^2$ of a polymethyl methacrylate polymer was applied on the front surface. The recording paper thus obtained has a good electrostatic recording property, and exhibited a good bonding property by heating at 100° C.

EXAMPLE 8

On the back surface of the conductive base paper in Example 1, 20 gr/m$^2$ of a solution was applied, the solution being prepared in such a way that 15 parts of a quaternary ammonium salt series conductive polymer as dissolved in water were added to 100 parts of a solid content of a polyvinyl acetate polymer emulsion. Thereafter, 4 gr/m$^2$ of a polymethyl methacrylate resin was applied on the front surface. The recording paper thus obtained was good in the recording characteristic. By heating the recording paper from the side of the adhesive layer with hot air at 115° C., it could be stuck onto ground paper without damaging the recording layer.

What we claim is:

1. Recording paper comprising a resin-containing photoconductive or dielectric recording layer, an electrically conductive base layer, and a heat-sensitive cohesion and/or adhesion layer which develops a cohesive and/or adhesive property by heating, said recording paper being so laminated tht said recording layer lies on one surface of said base layer and that said heat-sensitive cohesion and/or adhesion layer lies on the other surface, said heat-sensitive cohesion and/or adhesion layer being tackified at a tackiness developing temperature which is lower by at least 10° C. than the melting temperature of a resin of said recording layer.

2. The recording paper according to claim 1, wherein said heat-sensitive cohesion and/or adhesion layer is electrically conductive.

3. The recording paper according to claim 1, wherein said heat-sensitive cohesion and/or adhesion layer has a tackifier and/or a solid plasticizer added thereto.

4. The recording paper according to claim 1, wherein said recording layer is made of zinc oxide and/or at least one member selected from the group consisting of polyvinyl chloride, polyvinyl acetate, polyvinylidene chloride, polyvinyl chloride — vinyl acetate copolymers, polyvinyl acetal, saturated and unsaturated polyesters alkyd resins, modified alkyd resins, silicone resins, acrylate esters as well as methacrylate esters and their copolymers, styrene—butadiene copolymers, and melamine — formaldehyde resins.

5. The recording paper according to claim 1, wherein said recording layer contains filling material and/or a pigment.

6. The recording paper according to claim 1, wherein said base layer is made of a high polymer substance and at least one member selected from the group consisting of polysulfonated such as polystyrene sulfonate and polyvinyl sulfonate; polycarbonates such as polyacrylic acid and styrene — maleic anhydide copolymer; polyphosphates such as polyvinyl phosphate; polyamines such as polyethylene imine; high polymer electrolytes of, for example, quaternary ammonium salts such as polyvinyl benzil trimethyl ammonium chloride, poly N, N dimethyl 3–5 methyl pyperidium chloride and poly 4 vinyl N methyl pyridinium chloride; inorganic electrolytes such as sodium chloride; and conductive powder of metal carbon.

7. The recording paper according to claim 3, wherein said tackifier comprises at least one member selected from the group consisting of a rosin series resin, a polyterpene series resin, an aliphatic series hydrocarbon resin, an aromatic series petroleum resin, and a styrene series resin, a cumaroneindene resin, and their copolymers, said resins and said copolymers having softening points of 50 - 150° C.

8. The recording paper according to claim 3, wherein said solid plasticizer comprises at least one member selected from the group consisting of diphenyl phthalate, dicyclohexyl phthalate, dimethyl cyclohexyl phthalate, benzoic esters, and cyclohexyl p-toluene sulfonamide.

9. The recording paper according to claim 3, wherein said tackifier and/or said solid plasticizer amount to 10 - 200 parts by weight with respect to 100 parts by weight of a solid content of the polymer.

10. The recording paper according to claim 6, wherein said high polymer substance is at least one member selected from the group consisting of a natural pulp, a word pulp, and other cellulosic fiber, and their derived fiber or film, and a synthetic resin, said substance being in the form of a fiber or film.

11. Recording paper wherein a polymethacrylate resin with titanium oxide mixed therein is applied on a front surface of electrically conductive base paper which is impregnated with an quarternary ammonium salt series conductive polymer; a solution is applied on a back surface of said base paper, said solution being prepared by adding a synthetic terpene resin to a polyvinyl acetate — polyacrylate ester copolymer emulsion and then adding a quaternary ammonium salt series conductive polymer as diluted in alcohol to the resultant emulsion.

12. Recording paper wherein one surface of base paper is impregnated with a quaternary ammonium salt series conductive polymer, a tackifier in which dialyl phthalate prepolymer powder and a petroleum resin are dispersed in water is applied on the other surface, and after drying the base paper, an acrylate ester resin is applied on a conductive layer side.

13. Recording paper wherein a solution is applied on a back surface of electrically conductive base paper impregnated with a quaternary ammonium salt series conductive polymer, said solution being prepared by mixing maleic acid, phthalic acid and ethylene glycol in proportions of 1 : 1 : 2, causing them to react to produce a prepolymer, and adding a hydrogenated rosin to said prepolymer; and a polyvinyl chloride — polyvinyl acetate copolymer resin is applied on a front surface of said base paper.

14. Recording paper wherein a polyvinyl chloride — polyvinyl acetate copolymer with zinc oxide mixed therein is applied on a front surface of electrically conductive base paper whose both surfaces are impregnated with a quaternary ammonium salt conductive polymer; and a solution is applied on a back surface of said base paper, said solution being prepared by adding a quaternary ammonium salt series conductive agent as diluted in water to an ethylene — vinyl acetate copolymer emulsion.

15. Recording paper wherein a solution is applied on a back surface of electrically conductive base paper whose both surfaces are impregnated with a quaternary ammonium salt series conductive polymer, said solution being prepared by mixing maleic acid, phthalic acid and ethylene glycol in proportions of 1 : 1 : 2, causing them to react at 180° C. for 5 hours to produce an unsaturated polyester prepolymer, and adding 100 parts of a hydrogenated rosin; and thereafter a methyl ethyl ketone solution of a polyvinyl chloride — vinyl acetate copolymer resin is applied on a front surface of said base paper.

16. A method of manufacturing recording paper comprising the steps of coating and/or impregnating one surface of an electrically conductive base layer with a substance forming a dielectric layer, and coating and/or impregnating the other surface with a substance forming a heat-sensitive cohesion and/or adhesion layer.

* * * * *